United States Patent
Mundon

(10) Patent No.: US 9,656,728 B2
(45) Date of Patent: May 23, 2017

(54) METHOD FOR DEPLOYING AND RECOVERING A WAVE ENERGY CONVERTER

(71) Applicant: Oscilla Power, Inc., Seattle, WA (US)

(72) Inventor: Timothy R Mundon, Seattle, WA (US)

(73) Assignee: Oscilla Power, Inc., Seattle, WA (US)

( * ) Notice: Subject to any disclaimer, the term of this patent is extended or adjusted under 35 U.S.C. 154(b) by 18 days.

(21) Appl. No.: 14/808,436

(22) Filed: Jul. 24, 2015

(65) Prior Publication Data

US 2016/0023721 A1 Jan. 28, 2016

Related U.S. Application Data

(63) Continuation of application No. 62/028,582, filed on Jul. 24, 2014.

(51) Int. Cl.

| | |
|---|---|
| *B63B 22/20* | (2006.01) |
| *E02B 9/08* | (2006.01) |
| *F03B 13/20* | (2006.01) |
| *H02J 7/34* | (2006.01) |
| *H02K 7/18* | (2006.01) |
| *H02N 2/18* | (2006.01) |
| *B63B 22/18* | (2006.01) |

(52) U.S. Cl.
CPC ............. *B63B 22/20* (2013.01); *B63B 22/18* (2013.01); *E02B 9/08* (2013.01); *F03B 13/20* (2013.01); *H02J 7/34* (2013.01); *H02K 7/1876* (2013.01); *F05B 2230/60* (2013.01); *F05B 2260/02* (2013.01); *H02N 2/18* (2013.01); *Y02E 10/38* (2013.01)

(58) Field of Classification Search
CPC . B63B 22/20; B63B 22/18; E02B 9/08; F03B 13/20; H02K 7/1876; H02J 7/34; Y02E 10/38
USPC ...................................... 290/42, 53
See application file for complete search history.

(56) References Cited

U.S. PATENT DOCUMENTS

| | | | |
|---|---|---|---|
| 6,229,225 | B1 | 5/2001 | Carroll |
| 6,392,314 | B1 | 5/2002 | Dick |
| 6,435,774 | B1 | 8/2002 | Khachaturian |
| 7,323,790 | B2 | 1/2008 | Taylor et al. |
| 7,594,780 | B2 | 9/2009 | Bull |

(Continued)

FOREIGN PATENT DOCUMENTS

| | | |
|---|---|---|
| DE | 102010015156 | 6/2011 |
| EP | 1439306 | 7/2004 |

(Continued)

OTHER PUBLICATIONS

Thomas "International Search Report" Application No. PCT/US15/41997, 2 pages, mailed Jan. 11, 2016.

(Continued)

*Primary Examiner* — Viet Nguyen
(74) *Attorney, Agent, or Firm* — Kunzler Law Group

(57) ABSTRACT

A system for transporting a buoy and a heave plate. The system includes a buoy and a heave plate. An outer surface of the buoy has a first geometrical shape. A surface of the heave plate has a geometrical shape complementary to the first geometrical shape of the buoy. The complementary shapes of the buoy and the heave plate facilitate coupling of the heave plate to the outer surface of the buoy in a transport mode.

13 Claims, 5 Drawing Sheets

(56) References Cited

U.S. PATENT DOCUMENTS

| | | | |
|---|---|---|---|
| 7,649,276 B2 | 1/2010 | Kornbluh et al. | |
| 7,877,994 B2 | 2/2011 | Bull et al. | |
| 7,909,536 B2 | 3/2011 | Dick | |
| 8,723,355 B2 | 5/2014 | Eder et al. | |
| 8,826,658 B2 | 9/2014 | Foster et al. | |
| 2007/0257490 A1* | 11/2007 | Kornbluh | F03B 13/1845 290/53 |
| 2007/0257491 A1 | 11/2007 | Kornbluh et al. | |
| 2007/0266704 A1* | 11/2007 | Bull | B63B 35/4406 60/398 |
| 2007/0286683 A1* | 12/2007 | Bull | B63B 35/4406 405/195.1 |
| 2009/0309366 A1* | 12/2009 | Moore | B63B 35/44 290/53 |
| 2010/0117366 A1 | 5/2010 | Rhinefrank et al. | |
| 2010/0133843 A1* | 6/2010 | Nair | H01L 41/125 290/53 |
| 2010/0213710 A1* | 8/2010 | Rhinefrank | F03B 13/20 290/42 |
| 2010/0259047 A1* | 10/2010 | Chi | F03B 13/1855 290/53 |
| 2011/0089697 A1 | 4/2011 | Nair | |
| 2011/0113771 A1* | 5/2011 | Foster | F03B 13/189 60/501 |
| 2011/0155039 A1 | 6/2011 | Moore | |
| 2011/0198853 A1* | 8/2011 | Masters | F03B 11/06 290/54 |
| 2012/0139261 A1* | 6/2012 | Dick | F03B 13/20 290/1 C |
| 2012/0247096 A1 | 10/2012 | Gerber et al. | |
| 2012/0247809 A1 | 10/2012 | Stewart et al. | |
| 2012/0285160 A1* | 11/2012 | Hine | F03B 13/1885 60/497 |
| 2013/0341927 A1* | 12/2013 | Murphree | F03B 13/20 290/53 |
| 2014/0145442 A1* | 5/2014 | Hart | F03B 13/18 290/53 |
| 2014/0232116 A1* | 8/2014 | Thomson | A61K 31/337 290/53 |
| 2014/0252766 A1* | 9/2014 | Clark | F03B 13/16 290/42 |
| 2016/0003214 A1* | 1/2016 | Mundon | F03B 13/22 290/53 |

FOREIGN PATENT DOCUMENTS

| | | |
|---|---|---|
| EP | 1295031 | 3/2006 |
| WO | 2007130331 | 11/2007 |
| WO | 2007130385 | 11/2007 |
| WO | 2010096195 | 8/2010 |
| WO | 2011062576 | 5/2011 |
| WO | 2012106558 | 8/2012 |

OTHER PUBLICATIONS

Thomas "Written Opinion of the International Searching Authority" AApplication No. PCT/US15/41997, 5 pages, mailed Jan. 11, 2016.

Young "International Search Report" Application No. PCT/US15/50269, 2 pages, mailed Dec. 22, 2015.

Young "Written Opinion of the International Searching Authority" Application No. PCT/US15/50269, 8 pages, mailed Dec. 22, 2015.

\* cited by examiner

METHOD FOR DEPLOYING AND RECOVERING A WAVE ENERGY CONVERTER

CROSS-REFERENCE TO RELATED APPLICATIONS

This application claims the benefit of U.S. Provisional Application No. 62/028,582, entitled "Method for Deploying and Recovering a Wave Energy Converter," filed on Jul. 24, 2014, which is incorporated by reference herein in its entirety.

STATEMENT OF FEDERALLY SPONSORED RESEARCH

This invention was made with Government support under DE-SC0006352 awarded by the Department of Energy. The Government has certain rights to this invention.

BACKGROUND

Large-scale marine equipment is often transported as separate pieces and then assembled on location. For equipment that operates in open water, individual pieces may be hauled to the intended location, then assembling the several pieces together either on a vessel or while the pieces are floating or submerged in the water. However, hauling disassembled pieces of equipment may require substantial vessel capacity. On-site assembly can also be costly due to the complexity of assembling systems in limited spaces and the cost of vessels to be present during the assembly process.

Alternatively, equipment may be partially or fully assembled and then hauled in operational form to the intended location. However, hauling equipment in its assembled form may present some obstacles because of size or geometry.

SUMMARY

Embodiments of the system are presented for transporting a buoy and a heave plate. One embodiment of the system includes a buoy and a heave plate. An outer surface of the buoy has a first geometrical shape. A surface of the heave plate has a geometrical shape complementary to the first geometrical shape of the buoy. The complementary shapes of the buoy and the heave plate facilitate coupling of the heave plate to the outer surface of the buoy in a transport mode. Other embodiments of the system are also described.

Embodiments of a method for transporting a buoy and heave plate are also described. One embodiment of the method includes arranging the heave plate in a retracted position relative to a flotation device. The method also includes transporting the flotation device and the heave plate to a deployment site while the heave plate is in the retracted position relative to the flotation device. The method also includes deploying the flotation device and the heave plate at the deployment site, with the heave plate in a deployed position relative to the flotation device.

Other aspects and advantages of embodiments of the present invention will become apparent from the following detailed description, taken in conjunction with the accompanying drawings, illustrated by way of example of the principles of the invention.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate deployment of a wave energy converter. In particular, methods and associated structures and subsystems facilitate deployment of a wave energy converter which includes at least one surface float and at least one heave plate. The surface float and heave plate are first assembled such that the surface float and heave plate are tightly mechanically coupled together. Then the joined surface float and heave plate can towed to the deployment site together. Once at the deployment site, the heave plate is detached and lowered down to a specific depth below the surface float.

Figure 1:
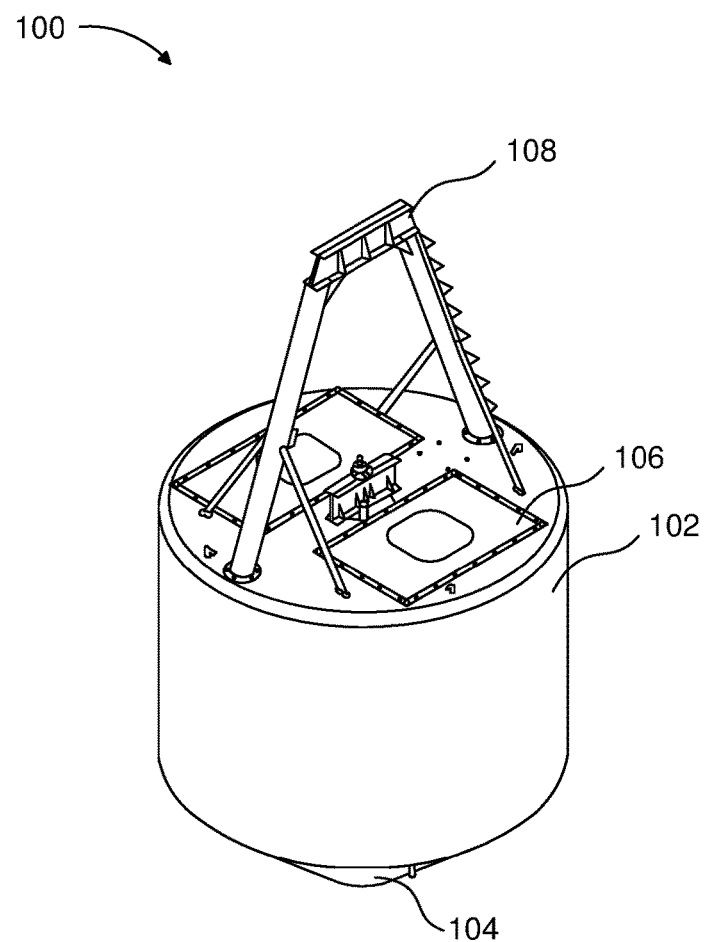
FIG. 1 illustrates a schematic diagram of one embodiment of a buoy with a first geometrical surface.

FIG. 1 illustrates a schematic diagram of one embodiment of a buoy 100. The illustrated buoy includes a flotation body 102 and a first geometrical surface 104. The flotation body 102 may include one or more interior spaces that are enclosed by access doors or panels 106. The interior spaces may house any sort of equipment such as tethers, cables, batteries, winches, and other electromechanical equipment or marine equipment. The illustrated buoy 100 also includes a tower 108 mounted on the top surface of the flotation body 102. The tower may be used to mount or engage other equipment, as described herein.

In the depicted embodiment, the bottom surface 104 of the flotation body 102 is has a convex shape so that at least a portion of the bottom surface 104 extends downward. The specific size, shape, or curvature of the bottom surface 104 may vary in different embodiments. In alternative embodiments, part or all of the bottom surface 104 may have a concave geometry. In further embodiments, the bottom surface 104 may have a combination of convex and concave geometries.

Figure 2:
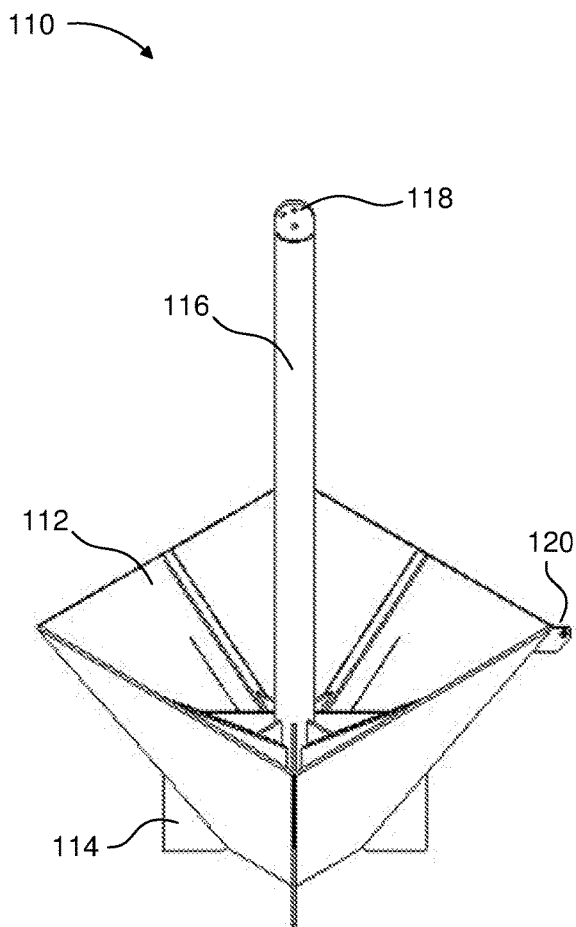
FIG. 2 illustrates a schematic diagram of one embodiment of a heave plate with a geometric shape that is complementary to the first geometrical surface of the buoy of FIG. 1.

FIG. 2 illustrates a schematic diagram of one embedment of a heave plate 110 with a geometric shape that is complementary to the first geometrical surface 104 of the buoy 100 of FIG. 1. Although the depicted heave plate 110 includes a specific arrangement of physical features to perform certain functions, other embodiments of the heave plate may include fewer or more features to perform fewer or more functions.

The illustrated heave plate 110 includes asymmetrical surfaces 112 to form an asymmetrical heave plate. As referred to herein, and asymmetrical heave plate has a physical geometry which facilitates different levels of resistance to movement in opposite vertical directions. For example, the illustrated heave plate 110 has a concave upper surface geometry and a corresponding convex lower surface geometry, which will facilitate faster movement in the downward direction and slower movement in the upward direction. In some embodiments, fins 114 or other guiding structures are attached to the surfaces 112 in order to help guide the heave plate 110 in predominantly vertical directions, as the buoy 100 pulls the heave plate 110 up in response to rising water levels, and as the heave plate 110 is pulled down by gravity when the buoy falls in receding water levels.

The depicted heave plate 110 also includes a post 116 or column. In some embodiments, the post 116 facilitates alignment of the heave plate 110 with the buoy 100 in a transport mode. In general, the post 116 may engage with a corresponding cylindrical chamber in the buoy 100. As the post enters the cylinder, the heave plate surfaces 112 are drawn in toward the bottom surface 104 of the buoy 100, allowing the heave plate 110 to engage with the buoy 100 in a very secure manner. Once the post 116 is fully inserted into the cylinder of the buoy 100, one or more locking mechanisms may be used to fasten the two components together. For example, the illustrated post 116 includes one or more mounting holes 118 which may be used to lock or pin the heave plate 110 into place when engaged in the transport mode with the buoy 100. In other embodiments, a separate flange 120 may be used to lock or couple the heave plate 110 to the buoy 100. Other embodiments may utilize any form or flange, hook, loop, lock, or other type of coupling device. Also, any type of locking mechanisms, including bolting or latching mechanisms, may be used to lock the heave plate 110 to the buoy 100.

Although the illustrated heave plate 110 only includes a single post 116, other embodiments may include more than one post 116. In such cases, the buoy 100 may include a corresponding number of holes and/or locking mechanisms for each post 116. Also, a corresponding number of tethers, attachments, and other features may be included.

In other embodiments, similar functionality may be achieved by using structures which are not necessarily cylindrical in form. For example, flanges, straps, cords, or any other suitable alignment and/or attachment structures may be used.

Figure 3:
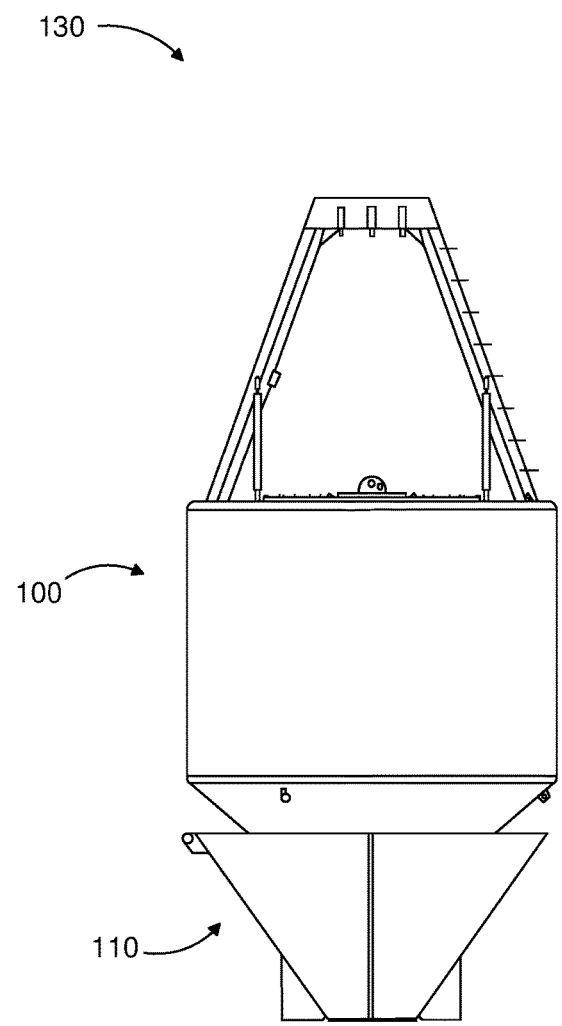
FIG. 3 illustrates a schematic diagram of one embodiment of a deployment system for transporting a buoy and heave plate engaged in a transport mode.

FIG. 3 illustrates a schematic diagram of one embodiment of a deployment system 130 for transporting a buoy 100 and heave plate 110 engaged in a transport mode. In the illustrated embodiment, the heave plate 110 is essentially coupled or mounted to the buoy 100 in a fixed position. Surfaces or components of the heave plate 110 may be in actual physical contact with the buoy 100. For example, the inside surface of the heave plate 110 may be in contact with the bottom surface of the buoy 100. Also, the top of the post (see FIG. 2) of the heave plate 110 may be locked into position at approximately the top surface of the buoy 100. In other embodiments, the post of the heave plate may extend further above or below the top surface of the buoy 100.

In some embodiments, the buoy 100 and heave plate 110 are mechanically coupled in such a fashion that they can be decoupled mechanically either remotely through electronic control or mechanically by at least one operator from the top surface of the buoy 100.

With regard to deployment into an ocean or other water environment, the buoy 100 and heave plate 110 can be coupled together in the transport mode prior to being put in the water. The buoy 100 and heave plate 110 can then be transported to and put in the water, for example, using a large crane or rolled in with wheels attached to the system or an external carriage using a ramp. Embodiments of the invention are not necessarily limited by the type of mechanisms that might be used to lift, push, pull, or otherwise move the deployment system 130. The deployment system 130 can then be hauled or towed to the deployment site using an appropriately sized marine vessel.

Figure 4:
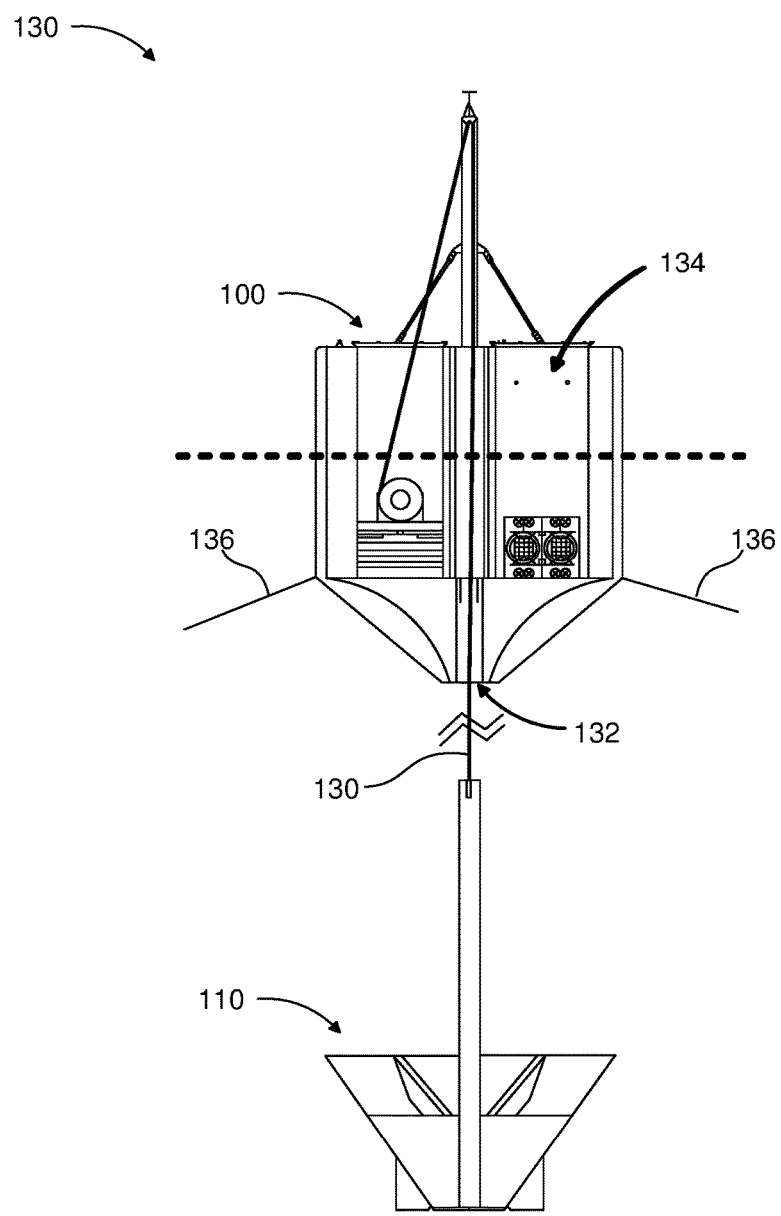
FIG. 4 illustrates another embodiment of the deployment system of FIG. 3 with the buoy and the heave plate in a deployed mode.

FIG. 4 illustrates another embodiment of the deployment system 130 of FIG. 3 with the buoy 100 and the heave plate 110 in a deployed mode. A hypothetical water level is indicated by the dashed horizontal line. In some embodiments, the heave plate 110 is detached from the buoy 100 and allowed to suspend from a tether 130 attached between the buoy 100 and heave plate 110. In some embodiments, the heave plate 110 is connected to the buoy 100 with one or more tethers 130 that are not rigid and so can be rolled on a mandrel or pulley during pre-integration and transport. In some embodiments, these tethers may be mechanically connected to the heave plate either during the pre-integration stage or at a later stage at the site.

The illustrated embodiment also shows the interior channel 132 through which the tether 130 passes in the deployment mode and into which the post 116 engages in the transport mode. In other embodiments, the tether 130 and post 116 may utilize separate channels.

The illustrated embodiment also shows internal chambers 134 within the body 102 of the buoy 100, accessible through the access doors 106. Depending on the size of the chambers 134, any type of equipment may be housed or stored in each of the internal chambers 134. In some embodiments, the chambers 134 house a tether controller, an electrical generation controller, batteries or other storage devices, and other equipment used in the deployment of the buoy 100 and heave plate 110.

In some embodiments, the deployment system 130 is attached to one or more station keeping mooring lines 136 at the deployment site. The mooring lines 136 may be preinstalled or installed at the time the system is deployed.

In some embodiments, on board structures such as at least one winch and/or crane that may be used to gradually lower the heave plate 110 to as specific depth after the mechanical connection is disengaged. In some embodiments, the tether 130 may be locked again in place by using one or more locking mechanisms.

Figure 5:
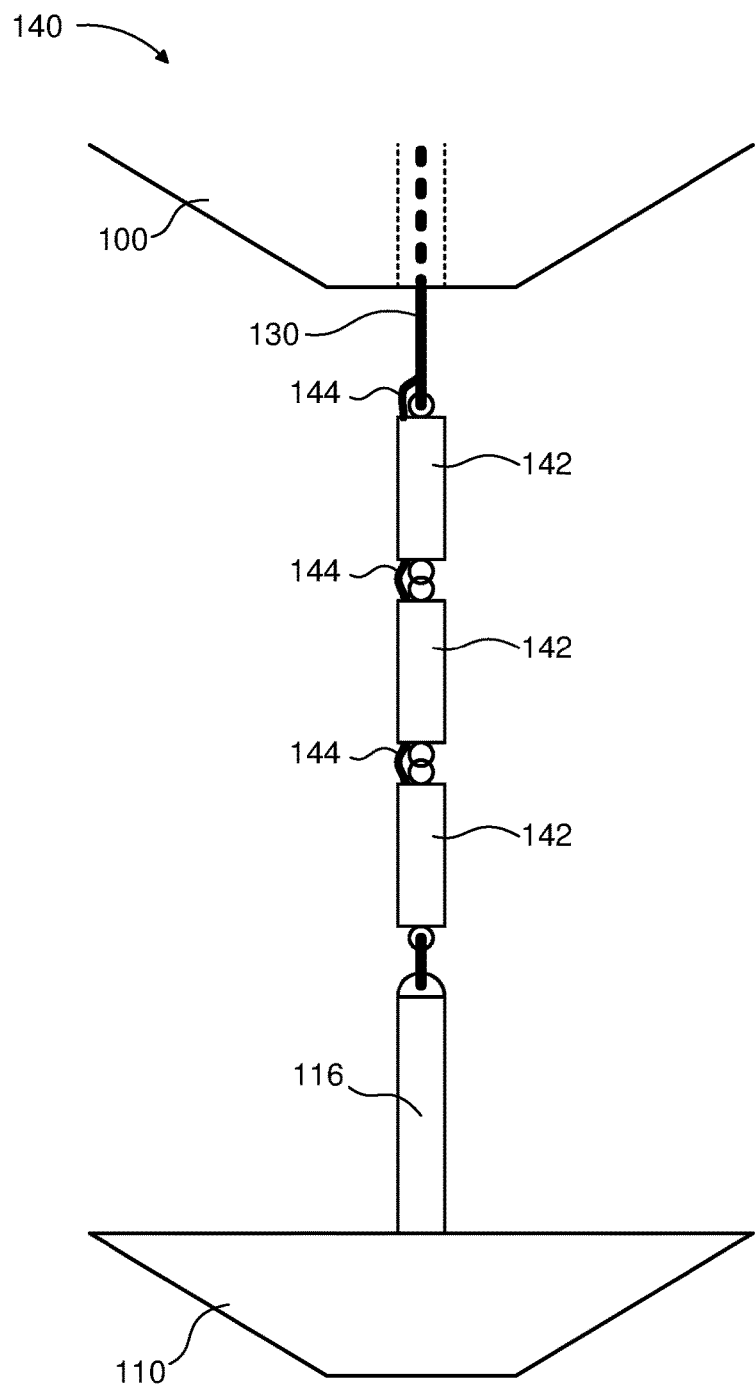
FIG. 5 illustrates one embodiment of a tether with magnetostrictive energy harvesters disposed between the buoy and the heave plate in the deployed mode.

FIG. 5 illustrates one embodiment of a tether system 140 with magnetostrictive energy harvesters 142 disposed between the buoy 100 and the heave plate 100 in the deployed mode. In general, the harvesters 142 are coupled together in series with the tether 130 so that an upward force on the tether 130 results in a tensile force on the harvesters 142 as the heave plate 110 resists upward motion. The tensile force results in a change in magnetic flux within the harvesters 142, which include conductive wires to induce a charge or current in response to the change in magnetic flux. A separate conductive transmission line 144 is included or incorporated with the tether 130 to transmit the generated electrical power to electronic systems or storage batteries at the buoy 100. Other systems may utilize other types of tethers 130 and/or magnetostrictive energy harvesters 142.

In some embodiments, the heave plate 110 may be retracted for maintenance or decommissioning. In some embodiments, the system may be recovered for maintenance or decommissioning by going through the reverse of the deployment operations described above. In some embodiments, the locking mechanisms may be disengaged, the heave plate 110 may be gradually raised up close to the buoy 100 using the on-board winches and/or cranes and mechanically locked again to the buoy 100. In some embodiments, the system may then be towed in the transport mode to shore or to another vessel for maintenance or decommissioning.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
a buoy, wherein an outer surface of the buoy has a first geometrical shape, wherein the first geometrical shape of the buoy is convex; and
a heave plate coupled to the buoy, wherein a surface of the heave plate has a geometrical shape complementary to the first geometrical shape of the buoy to facilitate coupling of the heave plate to the outer surface of the buoy in a transport mode, wherein the complementary geometrical shape of the heave plate is concave, and wherein at least a portion of the convex outer surface of the buoy extends into a cavity formed by the concave surface of the heave plate when the buoy and the heave plate are engaged in the transport mode.

2. The system of claim 1, further comprising:
a coupling disposed on the heave plate to engage and maintain the heave plate In the transport mode.

3. The system of claim 1, wherein the buoy further comprises:
an internal equipment chamber to house electrical/mechanical equipment.

4. The system of claim 1, wherein the buoy further comprises:
an internal channel passing through the buoy from a top surface to a bottom surface, wherein the internal channel is configured to house a heave plate post in the transport mode.

5. The system of claim 4, further comprising:
at least one tether coupled between the buoy and the heave plate.

6. The system of claim 5, further comprises:
a tower disposed on a top surface of the buoy, wherein the tower comprises a tether mount to engage the tether.

7. The system of claim 6, wherein the tether mount is linearly aligned with the internal channel passing through the buoy.

8. The system of claim 5, further comprising:
at least one magnetostrictive energy harvester coupled to the tether between the buoy and the heave plate, wherein the magnetostrictive energy harvester is configured to experience a tensile force in response to a mechanical force on the buoy away from the heave plate.

9. The system of claim 5, wherein the heave plate further comprises:
at least one fin disposed on an outer surface, wherein the fin is configured to influence vertical motion of the heave plate.

10. A method comprising:
arranging a heave plate in a retracted position relative to a flotation device, wherein an outer surface of the flotation device has a first geometrical shape that is convex;
transporting the flotation device and the heave plate to a deployment site while the heave plate is in the retracted position relative to the flotation device, wherein a surface of the heave plate has a complementary geometrical shape that is concave, wherein at least a portion of the convex outer surface of the flotation device extends into a cavity formed by the concave surface of the heave plate when the flotation device and the heave plate are engaged in the retracted position; and
deploying the flotation device and the heave plate at the deployment site, with the heave plate in a deployed position relative to the flotation device.

11. The method of claim 10, further comprising:
maintaining a tether in a retracted position while transporting the flotation device and the heave plate to the deployment site, wherein a first part of the tether is coupled to the flotation device, and a second part of the tether is coupled to the heave plate; and
extending the tether to position the heave plate in the deployed position below the flotation device.

12. The method of claim 10, further comprising:
inducing electrical energy in a plurality of magnetostrictive energy harvesters coupled to the tether in response to relative forces on the flotation device and the heave plate.

13. The method of claim 12, further comprising: storing the induced electrical energy in a battery.

\* \* \* \* \*